May 20, 1952     W. A. ARON     2,597,143

WAVE GUIDE JOINT

Filed Aug. 2, 1945

INVENTOR
WALTER A. ARON

BY

ATTORNEY

Patented May 20, 1952

2,597,143

UNITED STATES PATENT OFFICE 2,597,143

WAVE GUIDE JOINT

Walter A. Aron, Cambridge, Mass., assignor, by mesne assignments, to the United States of America as represented by the Secretary of the Navy Application August 2, 1945, Serial No. 608,601

8 Claims. (Cl. 178—44)

This invention relates to wave guide joints and more particularly to means whereby resonance effects are minimized when such joints are used over wide frequency ranges.

Various types of couplings for joining sections of hollow wave guides are well-known to the art. Common types of these couplings employ a combination of a choke and flange or two chokes, such as are disclosed in the patent applications of Winfield W. Salisbury, Serial No. 489,844, filed June 5, 1943, now Patent No. 2,451,876, issued October 19, 1948, and Ernest C. Okress, Serial No. 464,824, filed Nov. 6, 1942, now Patent No. 2,476,621, issued July 19, 1949. Choke-to-flange joints are usually used where small separations or lateral or angular displacements of the abutting wave guide ends are encountered, and choke-to-choke joints are used where greater separations or displacements are expected. This is due to the lower voltage standing wave ratios and hence reduced energy losses obtained with choke-to-choke joints over choke-to-flange joints for a given separation or displacement. The determining factor as to whether a choke-to-choke or choke-to-flange joint should be used in a given case is whether the displacements or separations from the mean position in any direction are expected to be more or less respectively than eight percent of the free space average wave length. However, when choke-to-choke joints are used, one or more broad resonance points are commonly encountered as the frequency of the energy transmitted by the wave guide coupling is varied ±10% of the mean frequency. At these resonance points, the voltage standing wave ratio increases sharply from less than 1.1 to 1.3–1.4 and the energy losses increase correspondingly. Resonance points of a similar nature are encountered with choke-to-flange joints, also, if the choke and flange are not in contact, but these are generally much sharper in nature. This invention utilizes a novel means to eliminate these resonance points in either case and thus permit transmission over a wide range of frequencies with either a choke-to-choke or choke-to-flange joint.

Accordingly, it is an object of this invention to provide a coupling means for wave guides.

Another object is to provide a coupling means for wave guides whereby a wide band or range of frequencies may be transmitted.

Another object is to provide a means for coupling wave guides whereby the abutting ends of the wave guides may be separated and/or displaced laterally, vertically, or angularly one from the other without producing large voltage standing wave ratios and energy losses when these couplings are operated at a fixed frequency.

Still another object is to provide a means for coupling wave guides whereby the abutting ends of the wave guides may be separated and/or displaced laterally, vertically, or angularly one from the other without producing large voltage standing wave ratios and energy losses when these couplings are operated over wide frequency ranges.

A further object is to provide such coupling means which are easily constructed at an economical cost.

Other and further objects will appear in the course of the following description when taken with the accompanying drawings in which.

Figure 1:
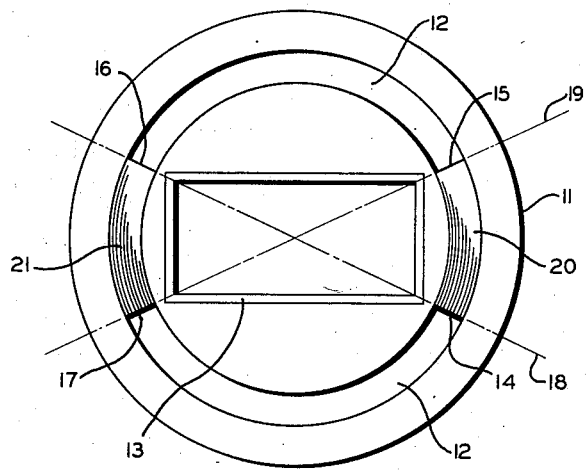
Fig. 1 shows a view of one abutting face of one embodiment of this invention.

In Fig. 1 is shown a face view of a standard choke 11 for rectangular wave guides which has a branch channel or annular groove 12 substantially an effective one-quarter wave length deep disposed substantially an effective one-quarter wave length from the center of the broad wall of wave guide 13. The choke construction thus far described constitutes a standard coupling component well-known to the art and hence need not be discussed further.

In order to prevent resonance effects when two such standard chokes face one another, as in choke-to-choke couplings or when a standard choke faces but does not touch a flange, as in some choke-to-flange couplings, it is necessary to force nulls of electric field intensity substantially at points 14, 15, 16, and 17 in annular groove 12 in each standard choke 11. These points further lie on diagonals 18 and 19 drawn through the inside corners of wave guide 13. Such nulls can be forced by producing an electrical short circuit at approximately these points, as by inserting plugs 20 and 21 in annular groove 12 in the positions shown. These plugs should be of a material which is a good conductor of electricity, such as copper, and should be a snug fit. They may be secured in place and at the same time made to make a good electrical connection with the walls and bottom of annular groove 12 by the use of solder. The exact position of the electrical short circuit is not critical. Tests have shown that the short (produced by the termination of the plug in the groove) may be placed a fairly wide distance either side of said points with equally good results.

Figure 2:
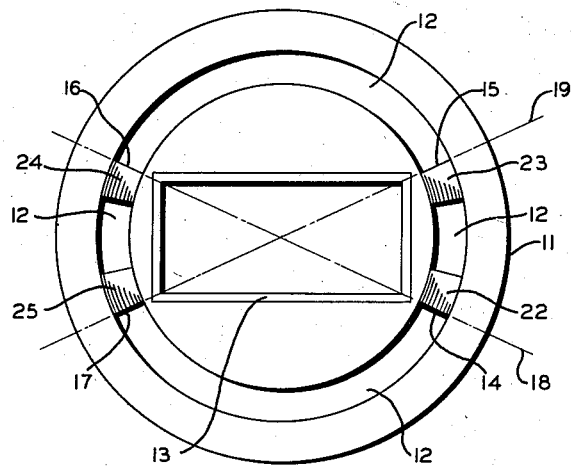
Fig. 2 shows a view of one abutting face of an alternative embodiment.

Fig. 2 shows the same choke 11, annular groove 12, wave guide 13, and diagonals 18 and 19 as in Fig. 1. In this embodiment, however, the electrical short circuits at the approximate points 14, 15, 16 and 17 (which are the same points as in Fig. 1) are produced by four separate plugs 22, 23, 24, and 25. These plugs are also made of any good electrically conducting material, preferably copper, and inlaid in solder in the positions shown in annular groove 12.

Figure 3:
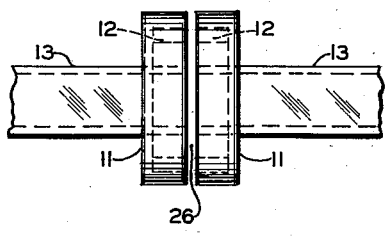
Fig. 3 shows a side view of a choke-to-choke joint constructed in accordance with this invention.

For coupling two rectangular wave guides together with a choke-to-choke joint, as shown in Fig. 3, it is necessary only to place chokes 11 employing this invention, such as is shown in Fig. 1 or 2, on the abutting ends of each wave guide 13, addressing the faces of these chokes one to the other and separating these faces by a small gap 26. According to the needs of the individual installation, these chokes may be rigidly fastened together, so fastened that slight displacements are possible, or left unsupported, one from the other, so that each may move independently. Means for providing such supports will be apparent to those skilled in the art and need not be given here. In a similar manner, a choke-to-flange joint may be constructed by placing a choke employing this invention, such as is shown in Fig. 1 or 2, on one abutting end of the wave guides and a conventional flange on the other, addressing the face of the choke to the face of the flange and separating these faces by a small gap. As above-mentioned, the manner and method of support for this coupling also depends upon the individual installation and will be apparent to those skilled in the art.

While specific embodiments of this invention have been described as required by the patent statutes, the principles of this invention are of broader application in ways which will be apparent to those skilled in the art.

What is claimed is:

1. A joint for rectangular wave guides for facilitating the transfer of electromagnetic energy across said joint, said rectangular wave guides being adapted to allow the transmission therethrough of electromagnetic energy of a predetermined mode, said joint including, means providing a gap between abutting ends of said wave guides at said joint, a structure on the extremity of each of said wave guides substantially integral electrically with each of said guides, said structures being of a configuration that extends said gap outwardly for a distance of substantially an effective quarter wave length from points on the current carrying surfaces of said guides at said gap at which points the electric field of said energy is a maximum, each of said structures having a configuration providing also for a branch channel having a depth of substantially a quarter wave length of said energy and communicating with said gap at a distance from said points on said current carrying surfaces of said guides of substantially an effective electrical quarter wave length of said energy, and two plugs of electrically conductive material disposed in each of said branch channels terminating said branch channels at points substantially determined by diagonals drawn through the inside corners of said wave guides, whereby nulls of electric field intensity are produced at said points.

2. A joint for rectangular wave guides for facilitating the transfer of electromagnetic energy across said joint, said joint including means providing a gap between abutting ends of said wave guides at said joint, a flange of conductive material at the end of, and electrically integral with, each wave guide, each of said flanges being formed with an annular groove therein having a geometric center coincident with the geometric center of the cross section of the guide, each of said grooves having a depth substantially equal to a quarter wave length of said electromagnetic energy, each of said flanges abutting one another and dielectrically insulated from one another, each of said annular grooves having a radius such that the distance from each annular groove to the center of the broad wall of said wave guides is substantially a quarter wave length of said energy, and two plugs of electrically conductive material disposed in each of said annular grooves terminating said grooves at points substantially determined by diagonals drawn through the inside corners of said wave guides, whereby nulls of electric field intensity are produced at said points.

3. A joint for facilitating the transfer of electromagnetic energy between two rectangular wave guides having adjacently disposed and spaced ends comprising, a conductive flange integrally connected to each of said ends and defining a gap between said wave guide ends and the mutually directed faces of said flanges, at least one of said flanges having an annular groove formed therein communicating with said gap and having a geometric center substantially coincident with the longitudinal axis of its associated wave guide, the separation of said groove from the center of each broad wall of said wave guide and the depth of said groove each being substantially one quarter wave length long measured at the frequency of said energy, and two electrically conductive plugs disposed in said annular groove and terminating said groove at points determined by the intersection of diagonals drawn through the inside corners of the associated rectangular wave guide and said groove, whereby nulls of electric field intensity are produced at said points.

4. Apparatus as in claim 3 wherein said plugs are disposed in the smaller two of the four angular regions defined by said diagonals.

5. A joint for facilitating the transfer of electro-magnetic energy between two rectangular wave guides having adjacently disposed and spaced ends comprising, a conductive flange integrally connected to each of said ends and defining a gap between said wave guide ends and the mutually directed faces of said flanges, at least one of said flanges having an annular groove formed therein communicating with said gap and having a geometric center substantially coincident with the longitudinal axis of its associated wave guide, the separation of said groove from the center of each broad wall of said wave guide and the depth of said groove each being substantially one quarter wave length long measured at the frequency of said energy, and four electrically conductive plugs disposed in and terminating said annular groove at points substantially determined by the intersections of diagonals drawn through the inside corners of the associated rectangular wave guide and said groove, whereby nulls of electric field intensity are produced at said points.

6. Apparatus as defined in claim 5 wherein two of said plugs are disposed in each of the smaller two of the four angular regions defined by said diagonals.

7. A joint for facilitating the transfer of electro-magnetic energy between two rectangular wave guides having adjacently disposed and spaced ends comprising, a conductive flange integrally connected to each of said ends and defining a gap between said wave guide ends and the mutually directed faces of said flanges, said flanges being formed to extend said gap radially outward a distance equal to at least a quarter wave length from maximum electric field points on the current carrying surfaces of said wave guides, at least one of said flanges being formed to provide a branch channel having a depth substantially equal to a quarter wave length of said energy and communicating with said gap at a distance from said maximum electric field points substantially equal to a quarter wave length of said energy, and two electrically conducting plugs terminating said branch channel at points determined by the intersection of diagonals drawn through the inside corners of the associated rectangular wave guide and said branch channel, whereby nulls of electric field intensity are produced at said points.

8. Apparatus as in claim 7 wherein said plugs are disposed in the smaller two of the four angular regions defined by said diagonals.

WALTER A. ARON.

REFERENCES CITED

The following references are of record in the file of this patent:

UNITED STATES PATENTS

| Number | Name | Date |
| --- | --- | --- |
| 2,321,521 | Salinger | June 8, 1943 |
| 2,332,952 | Tischer | Oct. 26, 1943 |
| 2,407,318 | Mieher | Sept. 10, 1946 |
| 2,473,724 | Okress | June 21, 1949 |